United States Patent [19]

Tanaka et al.

[11] Patent Number: 4,508,153

[45] Date of Patent: Apr. 2, 1985

[54] PNEUMATIC TIRES

[75] Inventors: Tsutomu Tanaka, Kodaira; Mitsuhisa Yahagi, Sayama; Shuichi Watanabe, Tokyo, all of Japan

[73] Assignee: Bridgestone Corporation, Tokyo, Japan

[21] Appl. No.: 613,998

[22] Filed: May 25, 1984

[30] Foreign Application Priority Data

May 26, 1983 [JP] Japan ................................. 58-91520

[51] Int. Cl.$^3$ ....................... B60C 15/06; B60C 15/04
[52] U.S. Cl. ......................... 152/362 CS; 152/356 R; 152/359; 152/362 R; 152/374; 152/DIG. 9; 152/DIG. 16
[58] Field of Search ......... 152/362 CS, 362 R, 356 R, 152/354 R, 374, 347, 359, 330 R, DIG. 4, DIG. 9, DIG. 16

[56] References Cited

U.S. PATENT DOCUMENTS

| 2,484,620 | 10/1949 | Glen | 152/362 CS |
| 2,592,844 | 4/1952 | Antonson | 152/362 CS |
| 4,365,659 | 12/1982 | Yoshida et al. | 152/374 X |

FOREIGN PATENT DOCUMENTS

| 122731 | 7/1944 | Australia | 152/362 CS |
| 1042613 | 11/1953 | France | 152/362 CS |
| 1433353 | 4/1976 | United Kingdom | 152/362 CS |

Primary Examiner—William A. Powell
Assistant Examiner—Thomas Bokan
Attorney, Agent, or Firm—Sughrue, Mion, Zinn, Macpeak, and Seas

[57] ABSTRACT

Disclosed herein is a pneumatic tire comprising a carcass composed of at least one cord ply extending between a pair of bead portions, an inner liner adhered to the inner surface of the carcass, and a rubber reinforcing layer made of a rubber composition different from and having a Shore A hardness higher than that of the inner liner and disposed at a lower part of the bead portion including a bead toe portion and a bead heel portion to form an outermost bead rubber at least at that region of the bead portion which comes into contact with a rim. In the tire, the rubber reinforcing layer is divided into an axially inside portion inclusive of the bead toe portion and an axially outside portion at a boundary surface located in an area between the bead toe portion and a position corresponding to ½ of a height of a rim flange, and the axially outside portion is extended over the height of the rim flange outwardly in the radial direction of the tire, and rubber of the axially inside portion is small in the Shore A hardness and abrasion resistance index and high in the breaking energy after heat deterioration as compared with that of the axially outside portion.

4 Claims, 3 Drawing Figures

PNEUMATIC TIRES

BACKGROUND OF THE INVENTION (1) Field of the Invention

This invention relates to a pneumatic tire, and more particularly to an improvement in a rubber reinforcing layer as an outermost bead rubber suitable for use in a pneumatic tubeless radial tire for heavy vehicles.

(2) Description of the Prior Art

In a pneumatic tubeless radial tire for heavy vehicles, a carcass composed of at least one ply containing mainly metal cords arranged in the radial direction of the tire is turned around each bead core from the inside to the outside to form a turnup portion. A stiffener having a substantially triangle shape in section is disposed between the carcass and its turnup portion. A cord-reinforcing layer composed of metal cords and/or organic fiber cords is disposed axially outside the turnup portion. Further a rubber reinforcing layer for improving the resistance to rim-chafing is disposed as a bead rubber at the outermost side of the cord reinforcing layer. The rubber reinforcing layer extends from the axially outside of the tire to the axially inside thereof through a bead heel portion, and is connected to a lower area of an inner liner at a position radially outside an edge portion of a bead toe to form a bead portion.

The structure of the rubber reinforcing layer, is generally one of two types, one of which being the case where the rubber reinforcing layer contacts with the carcass turnup portion and is covered with the inner liner, and the other being the case where the rubber reinforcing layer covers the lower portion of the inner liner, which mainly result from the difference between the manufacturing systems.

In any case, however, the rubber reinforcing layer is composed of a single rubber composition having rubber characteristics which are selected mainly for the purpose of improving the resistance to rim-chafing against a rim flange to be located axially outside this layer.

However, such an arrangement of the rubber reinforcing layer is apt to cause the breaking of the bead toe portion, which particularly results from the heat deterioration after use and is frequently produced when the tire is disassembled from and reassembled onto the rim.

With respect to the above latter arrangement in which the rubber reinforcing layer covers the lower portion of the inner liner, in addition to the breaking of the bead toe portion as mentioned above, a large number of cracks are produced at the axially inner portion of the rubber reinforcing layer by combining the feature that the heat deterioration takes place over a wide range particularly at the axially inner portion with the repeated stress concentration during the running of the tire under a load. Further, the adhesive force between the lower portion of the inner liner and the rubber reinforcing layer is lowered by the combination of the heat deterioration and the repeated stress concentration as described above, resulting in the occurrence of the peeling phenomenon therebetween.

When causing bead toe breaking, crack formation and/or peeling phenomenon, the air-tightness of the tire internal chamber filled with air is disadvantageously damaged, or if water remains in the tire internal chamber during the rim-assembling, water penetrates into the inside of the tire to produce the rusting of the metal cord, resulting in the cord breaking-up.

SUMMARY OF THE INVENTION

It is, therefore, an object of the invention to provide an arrangement and structure of the rubber reinforcing layer in the tire which can effectively avoid the breaking and cracks at the bead toe portion and further peeling phenomenon from the inner liner without sacrificing the resistance to rim-chafing.

The inventors have made various investigations and found that since the conventionally used rubber reinforcing layer is composed mainly of a rubber composition having as a rubber characteristic a high resistance to rim-chafing or abrasion resistance index, it causes the heat deterioration and tire problems accompanied therewith at the inner surface of the tire or at that side surface of the tire which is brought into contact with the filled air.

With the foregoing in mind, according to the invention, the rubber reinforcing layer is divided into two portions in accordance with their functional rules, whereby the desired object of the rubber reinforcing layer is achieved.

According to the invention, there is the provision of a pneumatic tire comprising a carcass composed of at least one cord ply extending between a pair of bead portions, an inner liner adhered to the inner surface of the carcass, and a rubber reinforcing layer made of a rubber composition different from and having a Shore A hardness higher than that of the inner liner and disposed at a lower part of the bead portion including a bead toe portion and a bead heel portion to form an outermost bead rubber at least at that region of the bead portion which comes into contact with a rim;

said rubber reinforcing layer being divided into an axially inside portion inclusive of the bead toe portion and an axially outside portion at a boundary surface located in an area between the bead toe portion and a position correspondings to $\frac{1}{2}$ of a height of a rim flange, said axially outside portion being extended over the height of the rim flange outwardly in the radial direction of the tire, and rubber of said axially inside portion being small in the Shore A hardness and abrasion resistance index and high in the breaking energy after heat deterioration as compared with that of said axially outside portion.

In the preferred embodiment of the invention, the axially inside portion is made of a rubber composition containing mainly natural rubber, while the axially outside portion is made of a rubber composition containing mainly butadiene rubber. Further, the boundary surface between the axially inside and outside portions is positioned between the bead toe portion and the bead heel portion. Moreover, the inner liner covers a radially outward region of the axially inside portion of the rubber reinforcing layer.

The main point of the invention lies in that the conventional rubber reinforcing layer is functionally divided into two portions, which use individual rubber compositions having rubber characteristics in compliance with the functional rules.

According to the invention, it is preferred that the rubber reinforcing layer have the boundary surface located in an area between the bead toe portion and a position corresponding to $\frac{1}{2}$ of the height h of the rim flange to be used, which is more preferably at the maximum width W of the bead core. Further, it is desirable that the boundary surface is inclined at a certain angle with respect to the axial direction of the tire and has a length or a joint length of 2-10 times the thickness of the rubber reinforcing layer.

Furthermore, the boundary surface should be located at that portion which is small in movement during running under a load, and assure a joint area as wide as possible in order to avoid failures such as peeling phenomenon and the like.

The axially inside portion of the rubber reinforcing layer separated at the boundary surface has a smaller Shore A hardness than that of the axially outside portion, and it has preferably a difference of at least 10° between them. That is, the axially inside portion has preferably the Shore A hardness in a range of 50°-67°. The reason for this limitation is due to the fact that the axially inside portion must follow the deformation to some extent for preventing cracking and breaking of the bead toe portion. However, the axially inside portion is designed to be higher in Shore A hardness than the inner liner, whereby the breaking or damaging of the axially inside portion is prevented during the mounting of the tire onto the rim.

Since the axially inside portion is not required to have the same abrasion resistance as the axially outside portion, it is sufficient to be not more than ½ of the axially outside portion as a value of abrasion resistance index measured by a Pico type abrasion test method according to ASTM D2228-69. For instance, the value of abrasion resistance index of the axially inside portion is about 60-120 and is preferable to be larger than that of the inner liner.

The value of the breaking energy after heat deterioration (kg/cm$^2$) is larger in the axially inside portion of the rubber reinforcing layer than in the axially outside portion thereof, preferably about 2-3 times larger than the latter, which corresponds to a range of 450-600 kg/cm$^2$.

The abrasion resistance index is represented by an index according to the Pico type abrasion test method in which the test result of a rubber composition having the following compounding recipe usually used as a rubber reinforcing layer is taken as a standard of 100.

| Natural rubber (NR) | 100 parts by weight |
| Carbon black ISAF | 50 parts by weight |
| Stearic acid | 2 parts by weight |
| Aromatic oil | 8 parts by weight |
| ZnO | 5 parts by weight |
| Vulcanization accelerator | 8 parts by weight |
| Sulfur | 2 parts by weight |

The breaking energy after heat deterioration is defined by an integral value of a stress-strain curve, in which an abscissa is a strain value, until the breaking is produced by a tensile test according to JIS K 6301 after the deterioration promotion under the conditions that the test sample is heated at 100° C. for 24 hours and left to stand in atmosphere. That is, breaking energy means the energy per unit volume.

According to the invention, it is preferable that the axially outside portion of the rubber reinforcing layer has a Shore A hardness of 65°-76°, an abrasion resistance index of 140-230 and a breaking energy of 160-260 kg/cm$^2$ in view of the deformation contributing to the rim chafing or the like.

BRIEF DESCRIPTION OF THE DRAWINGS

The invention will be described in detail with reference to the accompanying drawings, wherein.

DETAILED DESCRIPTION OF THE INVENTION

Figure 1A:
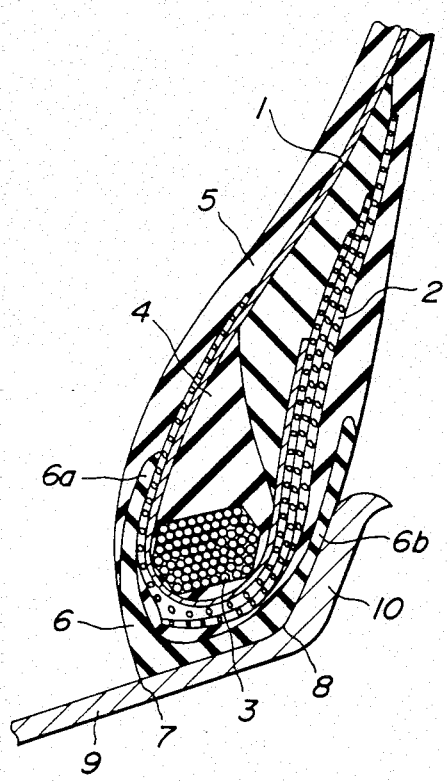
FIGS. 1a and 1b are partially sectional views of pneumatic tires with the conventional bead portion structures.
Figure 1B:
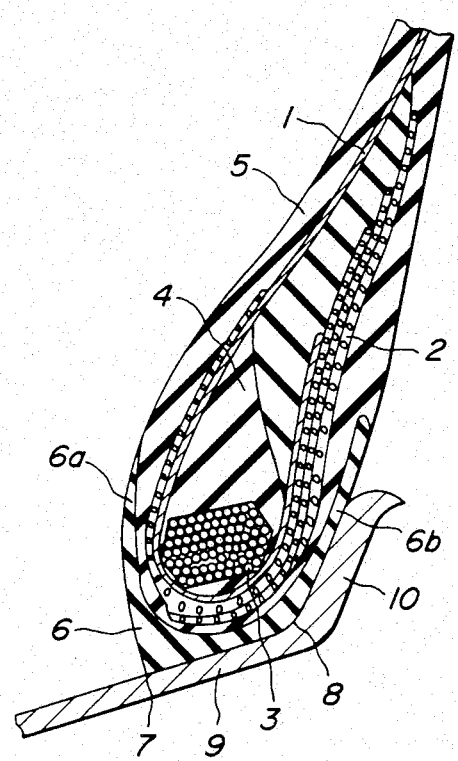

In each of FIGS. 1a and 1b is shown partially sectional view of a principal portion in a pneumatic tubeless radial tire for heavy vehicles with the conventional bead portion reinforcement as mentioned above. In these figures, 1 is a carcass composed of a ply containing metal cords therein, 2 a cord reinforcing layer containing organic fiber cords arranged along an axially outside of a turnup portion of the carcass around a bead core 3, 4 a stiffener, a 5 an inner liner and 6 a rubber reinforcing layer serving as a bead rubber. The suffixes a and b attached to the numeral 6 discriminate an axially inside portion and an axially outside portion, respectively. Further, 7 is a bead toe portion, 8 a bead heel portion, 9 a rim, and 10 a flange of the rim.

As previously mentioned, the structure of the rubber reinforcing layer 6 is roughly classified into two cases, one of which being the case that the axially inside portion 6a of the layer 6 is sandwiched between the lower portion of the inner liner 5 and the carcass 1, and the other of which being the case that the lower portion of the inner liner 5 is sandwiched between the axially inside portion 6a and the carcass 1.

Figure 2:
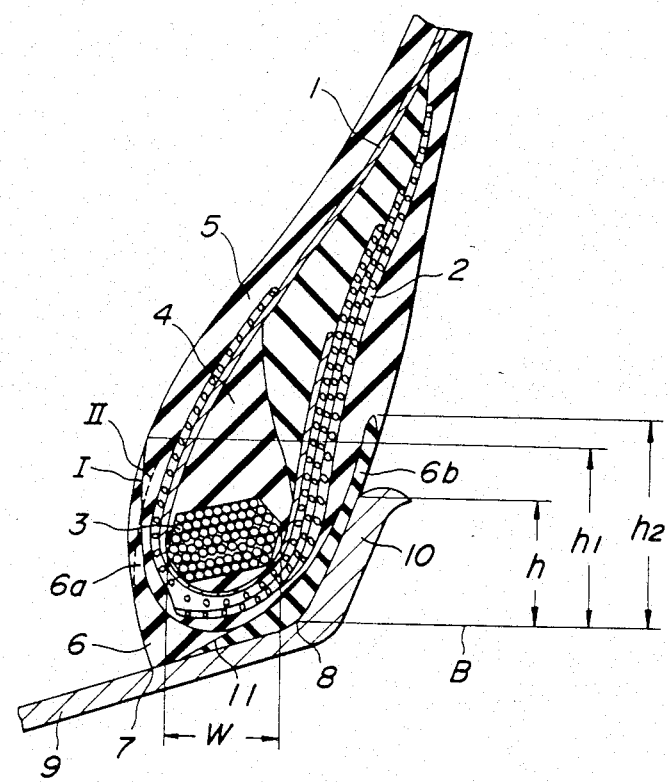
FIG. 2 is a partially sectional view of an embodiment of the pneumatic tire according to the invention.

On the contrary, according to the invention, as shown in FIG. 2, the rubber reinforcing layer 6 is functionally separated into an axially inside portion 6a inclusive of the bead toe portion 7 and an axially outside portion 6b by a boundary surface 11 located in an area between the bead toe portion 7 and a position corresponding to ½ of a height h of the rim flange 10 as measured from a bead base line B. Also, the axially inside and outside portions 6a and 6b are different from each other in terms of rubber characteristics.

The axially inside portion 6a of the rubber reinforcing layer 6 may cover the lower portion of the inner liner 5 as shown by the solid line (I) of FIG. 2, or the latter may in turn cover the former as shown by the broken line (II).

It is preferable that the boundary surface 11 is obliquely arranged with respect to the axial direction of the tire as shown in FIG. 2 and has a joint length corresponding to at least 2-10 times the maximum thickness of the rubber reinforcing layer 6. In this case, the inclination of the boundary surface may be upward to the right as shown in FIG. 2 or the left. What is important is that the boundary surface 11 is arranged at a portion where the movement is small during the running of the tire under a load in such a manner that one end of the boundary surface is positioned axially outward from the bead toe portion 7, while the other end is located beneath a position corresponding to ½ of the height h of the rim flange 10.

It is preferable that the Shore A hardness of the axially inside portion 6a of the rubber reinforcing layer 6 has a difference of at least 10° as compared with that of the axially outside portion 6b, and is within a range of about 50°-67° in order to prevent that deformation during the running under a load advances the cracking and breaking of the bead toe portion. Further, since the axially inside portion 6a is substantially unrelated to rim chafing which becomes severe as the rubber reinforcing layer approaches the vicinity of the edge of the flange 10 of the rim 9, the abrasion resistance of the axially inside portion 6a is sufficient to be lower than that of the axially outside portion 6b, and the difference as the abrasion resistance index between them may be about 50%.

For the axially outside portion 6b, it is preferable to employ a rubber having an abrasion resistance index of 140-230 in view of the prevention of rim chafing.

The breaking energy after heat deterioration is necessary to be higher in the axially inside portion 6a than in the axially outside portion 6b. The ratio in the breaking energy after heat deterioration between the portions is preferably not less than 2.0.

In order to satisfy the above rubber characteristics, it is preferable that the axially inside portion 6a is composed of a rubber composition containing mainly natural rubber and the axially outside portion 6b is composed of a rubber composition containing mainly butadiene rubber.

Particularly, when the axially inside portion 6a covers the lower portion of the inner liner 5 as shown by the solid line in FIG. 2, the peeling phenomenon tends to be caused during the running under a load, so that the rubber composition containing mainly natural rubber is advantageously suited for the axially inside portion. Because, the inner liner is usually composed of a rubber composition containing natural rubber and halogenated butyl rubber at a mixing ratio of 50/50~0/100 in parts by weight in the consideration of the air-permeability, which is more compatible with the rubber composition containing mainly natural rubber as compared with that containing mainly butadiene rubber.

Moreover, it is preferable that one edge of the axially inside portion 6a is terminated at a level $h_1$ substantially equal to or slightly higher than the height h of the flange 10 of the rim 9. On the other hand, it is a matter of course that the axially outside portion 6b is terminated at a level $h_2$ higher than the height h of the rim flange in view of the prevention of rim chafing. Preferably, the height $h_1$ is in a range of 0.5~1.5 times of the height h, while the height $h_2$ is in a range of 1.5~2.5 times of the height h.

Tubeless tires to be tested having a tire size of 11R 22.5 14 PR were prepared as follows:

A carcass 1 composed of a metal cord ply was turned around each bead core 3 from the inside to the outside to form a turnup portion, and a stiffener 4 was interposed radially upward on the bead core 3 between the carcass and its turnup portion. The stiffener 4 had an ordinary composite structure consisting of a base portion of hard rubber stock and an upper portion of soft rubber stock. On the outside of the turnup portion of the carcass 1 were arranged three cord reinforcing layers 2 each containing organic fiber cords inclined with respect to the radial direction of the tire, the cords of which were crossed with each other. Further, a rubber reinforcing layer 6 located around the bead core 3 was separated into an axially inside portion 6a and an axially outside portion 6b at a bead base portion as shown in FIG. 2. The axially inside portion 6a had the height $h_1$ of 15 mm at its radially outward end, while the axially outside portion 6b had the height $h_2$ of 30 mm, and the height h of the rim flange 10 was 12.5 mm. The rubber composition and physical properties of each of the axially inside and outside portions 6a and 6b of the rubber reinforcing layer 6 are shown in the following Table 1(a)-1(c).

TABLE 1

| | | | Test tire Example (I), (II) | Conventional tire A FIG. 1a | B FIG. 1b |
|---|---|---|---|---|---|
| Composition of rubber reinforcing layer | Axially outside portion (6b) | BR | 60 | Same as the immediate left column | Same as the immediate left column |
| | | NR | 40 | | |
| | | HAF | 65 | | |
| | | Stearic acid | 2 | | |
| | | ZnO | 4 | | |
| | | Aromatic oil | 6 | | |
| | | Sulfur | 2.5 | | |
| | | Vulcanization accelerator | 1.2 | | |
| | | Anti-oxidant | 3 | | |
| | Axially inside portion (6a) | NR | 100 | Same as those in (6b) | Same as the immediate left column |
| | | ISAF | 48 | | |
| | | Stearic acid | 2 | | |
| | | ZnO | 4 | | |
| | | Aromatic oil | 4 | | |
| | | Sulfur | 1.8 | | |
| | | Vulcanization accelerator | 1.0 | | |
| | | Anti-oxidant | 1.5 | | |
| Physical properties of rubber reinforcing layer | Axially outside portion (6b) | Shore A hardness (°) | 72 | Same as the immediate left column | Same as the immediate left column |
| | | Abrasion resistance index | 190 | | |
| | | Breaking energy after heat deterioration (kg/cm$^2$) | 220 | | |
| | Axially inside portion (6a) | Shore A hardness (°) | 57 | Same as those in (6b) | Same as the immediate left column |
| | | Abrasion resistance | 85 | | |

TABLE 1-continued

|  |  | Test tire Example (I), (II) | Conventional tire | |
|---|---|---|---|---|
|  |  |  | A FIG. 1a | B FIG. 1b |
|  | index Breaking energy after heat deterioration (kg/cm²) | 520 | | |
| Evaluation items | Resistance to rim*¹ chafing | 100 | 100 | 100 |
|  | Breaking of bead toe*² portion | None | Occurred at three circumferential positions | Occurred at five circumferential positions |
|  | Crack*³ | None | None | Numerous cracks of about 50~100 mm formed over the whole circumference |
|  | Peeling from inner*⁴ liner | None | None | Peeling of about 300~500 mm occurred over several circumferential positions |

According to the invention, example I corresponds to the embodiment as shown by the solid line in FIG. 2, while example II corresponds to the embodiment as shown by the broken line in FIG. 2 in which the axially inside portion 6a of the rubber reinforcing layer 6 was sandwiched between the inner liner 5 and the carcass turnup portion as in FIG. 1a.

The evaluation for the test items shown in Tables 1(a)–1(c) was carried out under the following conditions:

(a) Running conditions:
  indoor drum;
    internal pressure 7.25 kg/cm²
    load 3,000 kg
    running distance 100,000 km (b) Evaluation items:

The test tire after the running over the above predetermined distance was examined with respect to the following items.

*1 Resistance to rim chafing

There were compared the deformation amounts of the axially outside portion of the rubber reinforcing layer at an area where the axially outside portion contacted with the rim flange.

*2 Breaking of bead toe portion

The number of the breakings of the bead toe portion which occurred was observed after the tire was disassembled from the rim.

*3 Crack

There were observed the length and the number of circumferential crack which occurred at the largest strain position due to the aging of the rubber reinforcing layer.

*4 Peeling from inner liner

There were observed the length and the number of circumferential peeling of the tip portion of the axially inside portion of the rubber reinforcing layer from the inner liner.

The conventional tires A and B in Table 1 correspond to the tires as shown in FIGS. 1a and 1b and have the same construction as in the test tires, respectively, except that the axially inside and outside portions 6a and 6b of the rubber reinforcing layer 6 are composed of a single rubber composition.

According to the invention, all the problems which are apt to be produced mainly in the first life of the conventional tire, such as breaking of the axially inside portion, particularly the bead toe portion, cracks thereof and the peeling phenomenon from the inner liner are advantageously solved without deteriorating the resistance to rim chafing in the rubber reinforcing layer, whereby the acceptable ratio as a base tire for renewal can be increased profitably and also the damaging of the tire in use or during the assembling onto the rim can substantially be avoided.

What is claimed is:

1. A pneumatic tire comprising a carcass composed of at least one cord ply extending between a pair of bead portions, an inner liner adhered to the inner surface of the carcass, and a rubber reinforcing layer made of a rubber composition different from and having a Shore A hardness higher than that of the inner liner and disposed at a lower part of the bead portion including a bead toe portion and a bead heel portion to form an outermost bead rubber at least at that region of the bead portion which comes into contact with a rim;

said rubber reinforcing layer being divided into an axially inside portion inclusive of the bead toe portion and an axially outside portion extending from a boundary surface located in an area between the bead toe portion and a position corresponding to ½ of a height of a rim flange, said axially outside portion being extended over the height of the rim flange outwardly in the radial direction of the tire, and rubber of said axially inside portion being small in the Shore A hardness and abrasion resistance index and high in the breaking energy after heat deterioration as compared with that of said axially outside portion.

2. A pneumatic tire according to claim 1, wherein said axially inside portion of the rubber reinforcing layer is composed of a rubber composition containing mainly natural rubber, while said axially outside portion is composed of a rubber composition containing mainly butadiene rubber.

3. A pneumatic tire according to claim 1, wherein said boundary surface between the axially inside portion and the axially outside portion lies between the bead toe portion and the bead heel portion.

4. A pneumatic tire according to claim 1, wherein the inner liner covers a radially outward region of the axially inside portion of the rubber reinforcing layer.

* * * * *